United States Patent
Alex et al.

[11] Patent Number: 6,045,919
[45] Date of Patent: Apr. 4, 2000

[54] ANTISTATIC FILM FOR PACKAGING MATERIALS DIFFUSING VOLATILE PRODUCTS

[75] Inventors: Patrick Alex, Limours Pecqueuse; Alain Bouilloux, Bernay, both of France

[73] Assignee: Elf Atochem S.A., France

[21] Appl. No.: 09/125,979

[22] PCT Filed: Jan. 6, 1998

[86] PCT No.: PCT/FR98/00008

§ 371 Date: Dec. 11, 1998

§ 102(e) Date: Dec. 11, 1998

[87] PCT Pub. No.: WO98/30389

PCT Pub. Date: Jul. 16, 1998

[30] Foreign Application Priority Data

Jan. 6, 1997 [FR] France .................................. 97 00052

[51] Int. Cl.[7] .................................................. B32B 27/08
[52] U.S. Cl. .................................... 428/476.9; 428/474.4; 428/474.9; 428/500
[58] Field of Search ............................. 428/474.4, 474.9, 428/476.9, 500

[56] References Cited

U.S. PATENT DOCUMENTS

| | | | |
|---|---|---|---|
| 3,639,502 | 2/1972 | Okazaki et al. | 260/857 R |
| 3,839,245 | 10/1974 | Schlossman et al. | 260/18 N |
| 4,115,475 | 9/1978 | Foy et al. | 260/857 PE |
| 4,195,015 | 3/1980 | Deleens | 260/45.75 C |
| 4,230,838 | 10/1980 | Foy et al. | 525/408 |
| 4,331,786 | 5/1982 | Foy et al. | 525/408 |
| 4,332,920 | 6/1982 | Foy et al. | 525/408 |
| 4,612,221 | 9/1986 | Biel et al. | 428/35 |
| 4,819,374 | 4/1989 | Gemgnani | 47/58 |
| 4,839,441 | 6/1989 | Cuzin et al. | 528/328 |
| 4,864,014 | 9/1989 | Cuzin et al. | 528/279 |
| 5,070,145 | 12/1991 | Guerdoux | 525/179 |
| 5,342,886 | 8/1994 | Glotin et al. | 525/66 |
| 5,369,179 | 11/1994 | Havens | 525/183 |
| 5,604,284 | 2/1997 | Ueda et al. | 524/434 |
| 5,652,326 | 7/1997 | Ueda et al. | 528/288 |

FOREIGN PATENT DOCUMENTS

| | | |
|---|---|---|
| 0342 066 | 11/1989 | European Pat. Off. . |
| 0 476 895 A2 | 3/1992 | European Pat. Off. . |
| 0 506 515 A1 | 9/1992 | European Pat. Off. . |
| 0 564 338 A1 | 10/1993 | European Pat. Off. . |
| 0 595 706 A1 | 5/1994 | European Pat. Off. . |
| 0 613 919 A1 | 9/1994 | European Pat. Off. . |
| 1.585.637 | 1/1969 | France . |
| 2.178.205 | 11/1973 | France . |
| 2.291.225 | 6/1976 | France . |
| 2.519.012 | 7/1983 | France . |
| 5-202239 | 8/1993 | Japan . |

*Primary Examiner*—Helen L. Pezzuto

[57] ABSTRACT

The invention relates to antistatic wrapping films comprising at least one layer made of polyamide or of an alloy of polyamide and of polyolefin. The antistatic additive is a polymer containing polyamide blocks and polyether blocks. They are particularly useful for wrapping expandable polystyrene which contains pentane.

12 Claims, No Drawings

ANTISTATIC FILM FOR PACKAGING MATERIALS DIFFUSING VOLATILE PRODUCTS

FIELD OF THE INVENTION

The present invention relates to a film for wrapping materials which diffuse volatile products. It is particularly useful for expandable polystyrene beads or granules which contain a flammable expansion agent such as pentane. The film of the invention has good barrier properties towards pentane. Furthermore, it is antistatic, which ensures that during its manufacture there will be no build-up of static electricity which can cause arcs that perforate the film, making it unsuitable for its use.

Furthermore, when it is used as a container, frictional contact with the wrapping cannot cause build-ups of static electricity and then arcs which could ignite the pentane.

The present invention relates to an antistatic film made of polyamide or of an alloy of polyamide and polyolefin. It is useful for wrapping materials which diffuse volatile products. The antistatic effect ensures that, during its manufacture, there will be no electric arcs caused by a build-up of static electricity, for example due to the frictional contact with the rollers of the manufacturing machines. Electric arcs can give rise to perforation of the film, which damages its leak tightness. They can also interfere with any printing of the film. The good barrier properties of the film make it possible to prevent the loss of volatile products. These products can be, for example, perfumes with which granules of a porous material have been impregnated, or water since it is necessary for certain materials to contain moisture, or because they naturally contain moisture and they should not become dehydrated. Generally, bags for materials which diffuse non-flammable volatile products are formed by hot-welding or by electronic sewing and if the bag is not antistatic, it is possible to have granules of material in the position of the weld for closing the bag, thereby making the closure of the bag non-leaktight. As regards wrapping which contains readily flammable volatile products, forming them by hot-welding is avoided, so a knot is made. On the other hand, the antistatic nature of the wrapping prevents electric arcs caused by build-up of static electricity, it being possible for these arcs to cause fires either during the filling of the bag or in the course of transportation and storage. The reason for this is that it is not possible to prevent some slight loss across the film, and a bag would thus cause a fire.

The invention also relates to wrapping comprising these films.

According to a first form, the film of the invention is made of polyamide or of an alloy of polyamide and of polyolefin, in which is dispersed an additive in order to make it antistatic. These additives can be various products, polymers or carbon black.

According to a second form, the film of the invention comprises at least one inner layer (A) made of polyamide or of an alloy of polyamide and of polyolefin, and on each side an antistatic outer layer (B) made of polyolefins, of polyamide or of an alloy of polyamide and of polyolefin, in which is dispersed an antistatic additive. Advantageously, the film according to this second form of the invention consists of 3 layers: B/A/B. A coextrusion binder can be placed between the layers (A) and (B) or alternatively the layers (B) or the layer (A) can contain products which improve the adhesion of the layers (A) and (B).

BACKGROUND OF THE INVENTION

The prior art has already described films made of an alloy of polyamide and of polyolefin, and in particular EP 506,515 describes such films for protecting polyesters before they are crosslinked in the SMC (sheet molding compound) process; these films are leaktight to the free styrene present in the polyesters to be crosslinked, and then, after shaping the polyester, this film is peeled off in order to recover the article made of polyester. These films are not antistatic.

U.S. Pat. No. 4,612,221 describes films consisting of a layer of polyamide between two layers of polypropylene containing a bonding agent. These films serve to protect food and must remain resistant in microwave ovens.

U.S. Pat. No. 4,819,374 describes films consisting of a layer of polyamide and a layer of polyolefin, which are useful for covering soil into which fumigates are injected, in order to keep them in the soil.

None of these films is antistatic.

The prior art has thus not described the technical problem of the present invention.

DESCRIPTION OF THE INVENTION

The invention will now be described in detail.

As regards the first form of the invention, the term polyamide is understood to refer to the condensation products:

- of one or more amino acids, such as aminocaproic, 7-aminoheptanoic, 11-aminoundecanoic and 12-aminododecanoic acid of one or more lactams such as caprolactam, oenantholactam and lauryllactam;
- of one or more salts or mixtures of diamines such as hexamethylenediamine, dodecamethylenediamine, meta-xylylenediamine, bis-p-aminocyclohexylmethane and trimethylhexamethylenediamine with diacids such as isophthalic, terephthalic, adipic, azelaic, suberic, sebacic and dodecanedicarboxylic acid;
- or of mixtures of several of these monomers which lead to copolyamides.

Polyamide mixtures can be used. PA-6, PA-6,6 and PA 12 are advantageously used.

As regards the alloys of polyamide and of polyolefin, they consist of at least one polyamide from among those which have just been mentioned and of at least one polyolefin.

The term polyolefin is understood to refer to polymers comprising olefin units such as, for example, ethylene, propylene, 1-butene, etc. units.

By way of example, mention may be made of:

- polyethylene, polypropylene, copolymers of ethylene with α-olefins. These products can be grafted with unsaturated carboxylic acid anhydrides such as maleic anhydride or unsaturated epoxides such as glycidyl methacrylate.
- copolymers of ethylene with at least one product chosen from (i) unsaturated carboxylic acids, their salts, their esters, (ii) vinyl esters of saturated carboxylic acids, (iii) unsaturated dicarboxylic acids, their salts, their esters, their hemiesters, their anhydrides, (iv) unsaturated epoxides.

Styrene/butadiene/styrene (SBS) block copolymers, styrene/isoprene/styrene (SIS) block copolymers.

These ethylene copolymers can be grafted with unsaturated dicarboxylic acid anhydrides or unsaturated epoxides.

- styrene/ethylene-butene/styrene (SBES) block copolymers. The block copolymers can optionally be maleic-treated.

Mixtures of two or more of these polyolefins can be used. The following are advantageously used:

polyethylene, copolymers of ethylene and of an α-olefin, copolymers of ethylene/an alkyl (meth)acrylate, copolymers of ethylene/an alkyl (meth)acrylate/maleic anhydride, the maleic anhydride being grafted or copolymerized, copolymers of ethylene/an alkyl (meth)acrylate/glycidyl methacrylate, the glycidyl methacrylate being grafted or copolymerized, polypropylene.

Advantageously, the alloys of polyamide and of polyolefin have a polyamide matrix.

In order to facilitate the formation of the polyamide matrix, and if the polyolefins have few or no functions which can facilitate compatibilization, it is recommended to add a compatibilizing agent.

The compatibilizing agent is a product which is known per se for compatibilizing polyamides and polyolefins.

Mention may be made, for example, of:

polyethylene, polypropylene, ethylene/propylene copolymers, ethylene/butene copolymers, all of these products being grafted with maleic anhydride or glycidyl methacrylate, ethylene/alkyl (meth)acrylate/maleic anhydride copolymers, the maleic anhydride being grafted or copolymerized, ethylene/vinyl acetate/maleic anhydride copolymers, the maleic anhydride being grafted or copolymerized, the previous two copolymers in which the maleic anhydride is replaced by glycidyl methacrylate, ethylene/(meth)acrylic acid copolymers and optionally their salts, polyethylene, propylene or ethylene/propylene copolymers, these polymers being grafted with a product which has a site that is reactive with amines; these grafted copolymers are then condensed with polyamides or polyamide oligomers having only one amine end.

These products are described in patents FR 2,291,225 and EP 342,066, the content of which is incorporated into the present application.

The amount of polyamide forming the matrix can be between 55 and 95 parts per 5 to 45 parts of polyolefins.

The amount of compatibilizing agent is the amount which is sufficient for the polyolefin to be dispersed in the form of nodules in the polyamide matrix. It can represent up to 20% of the weight of the polyolefin. These polymers are manufactured by mixing the polyamide, polyolefin and optionally the compatibilizing agent according to the usual techniques for mixing in the molten state (twin-screw, Buss, single-screw).

Advantageously, the alloy of polyamide and of polyolefin comprises a matrix of polyamide 6 (PA-6) or 66 (PA-6,6) in which are dispersed either nodules of a mixture of low-density polyethylene and of copolymer of ethylene, of alkyl (meth)acrylate and of maleic anhydride or of glycidyl methacrylate, or nodules of polypropylene.

Such products are described in patents U.S. Pat. No. 5,070,145 and EP 564,338.

In the case of polypropylene, a compatibilizing agent is added which is advantageously an ethylene/propylene copolymer with a numerical predominance of propylene units, grafted with maleic anhydride and then condensed with monoamino caprolactam oligomers.

Such mixtures of polyamide and of polyolefin are described in patent U.S. Pat. No. 5,342,886.

Preferably, the amount of polyamide is between 50 and 75 parts per 100 parts of the alloy of polyamide and of polyolefin.

By way of example, the following mixtures (in % by weight) can be used:

1) 55 to 70% of PA-6,
   5 to 15% of an ethylene/propylene copolymer with a predominant amount of polypropylene grafted with maleic anhydride and then condensed with monoamino caprolactam oligomers,
   the remainder to 100% being polypropylene.

2) 55 to 70% of PA-6,
   5 to 15% of at least one copolymer of ethylene with (i) an alkyl (meth)acrylate or a vinyl ester of unsaturated carboxylic acid and (ii) an unsaturated carboxylic acid anhydride or an unsaturated epoxide which is grafted or copolymerized,
   the remainder being polyethylene.

3) 55 to 70% of PA-6,
   5 to 15% of polyethylene or copolymers of ethylene and of an α-olefin grafted with maleic anhydride or with glycidyl methacrylate,
   the remainder being polyethylene.

These polyamides or alloys of polyamide and of polyolefins contain additives to make them antistatic. It is recommended to use additives which do not migrate during use over time, or even which do not migrate or exude during conversion of the polyamide or of the alloy of polyamide and of polyolefin into a film, since there would be a loss of antistatic effect.

Mention may be made, for example, of carbon black. The amount can be from 5 to 15 parts per 100 parts of polyamide or of alloy. Mention may also be made of polymers containing polyether blocks derived from polyethylene glycol or containing a predominant amount of units derived from ethylene oxide. These are, for example, copolymers of ethylene and of polyethylene glycol (meth)acrylate, copolymers of ethylene and of polyetherdiol (meth)acrylate containing units derived from ethylene oxide and units derived from propylene oxide, polyether urethanes containing PEG blocks and polymers containing polyamide blocks and polyether blocks in which the polyether blocks contain at least 50% by weight of polyethylene glycol, i.e. of units derived from ethylene oxide.

The polymers containing polyamide blocks and polyether blocks result from the copolycondensation of polyamide blocks containing reactive ends with polyether blocks containing reactive ends, such as, inter alia:

1) Polyamide blocks containing diamine chain ends with polyoxyalkylene blocks containing dicarboxylic chain ends.

2) Polyamide blocks containing dicarboxylic chain ends with polyoxyalkylene blocks containing diamine chain ends, obtained by cyanoethylation and hydrogenation of aliphatic, α,Ω-dihydroxylated polyoxyalkylene blocks known as polyetherdiols.

3) Polyamide blocks containing dicarboxylic chain ends with polyetherdiols, the products obtained being, in this specific case, polyetheresteramides.

The polyamide blocks containing dicarboxylic chain ends are derived, for example, from the condensation of α,Ω-aminocarboxylic acids of lactams or of dicarboxylic acids and diamines in the presence of a chain-limiting dicarboxylic acid. Advantageously, the polyamide blocks are polyamide-12 or polyamide-6.

The number-average molar mass $\overline{Mn}$ of the polyamide blocks is between 300 and 15,000 and preferably between 600 and 5000. The mass $\overline{\text{Mn}}$ of the polyether blocks is between 100 and 6000 and preferably between 200 and 3000.

The polymers containing polyamide blocks and polyether blocks can also comprise randomly distributed units. These polymers can be prepared by the simultaneous reaction of the polyether and the precursors of the polyamide blocks.

For example, polyetherdiol, a lactam (or an α,Ω-amino acid) and a chain-limiting diacid can be reacted in the presence of a small amount of water. A polymer is obtained essentially having polyether blocks, polyamide blocks of very variable length, but also various reagents which have reacted randomly and are distributed randomly along the polymer chain.

Whether they are derived from the copolycondensation of polyamide and polyether blocks prepared beforehand or from a one-step reaction, these polymers containing polyamide blocks and polyether blocks have, for example, Shore D hardnesses which can be between 20 and 75 and advantageously between 30 and 70 and an intrinsic viscosity of between 0.8 and 2.5, measured in meta-cresol at 250° C. for an initial concentration of 0.8 g/100 ml.

Whether the polyether blocks are derived from polyethylene.glycol, polyoxypropylene glycol or polyoxytetramethylene glycol, they are either used as they are and copolycondensed with polyamide blocks containing carboxylic ends, or they are aminated in order to be converted into polyetherdiamines and condensed with polyamide blocks containing carboxylic ends. They can also be mixed with polyamide precursors and a chain-limiting agent in order to make polymers containing polyamide blocks and polyether blocks having randomly distributed units.

Polymers containing polyamide and polyether blocks are described in U.S. Pat. Nos. 4,331,786, 4,115,475, 4,195,015, 4,839,441, 4,864,014, 4,230,838 and 4,332,920.

The polyether can be, for example, a polyethylene glycol (PEG), a polypropylene glycol (PPG) or a polytetramethylene glycol (PTMG). The latter is also known as polytetrahydrofuran (PTHF).

Whether the polyether blocks are in the chain of the polymer containing polyamide blocks and polyether blocks in the form of diols or diamines, they are known for simplicity as PEG blocks or PPG blocks or else PTMG blocks.

It would not constitute a departure from the scope of the invention if the polyether blocks contained several different units such as units derived from ethylene glycol, from propylene glycol or from tetramethylene glycol. Advantageously, the polyether blocks contain at least 50% by weight of units derived from ethylene oxide.

Preferably, the polymer containing polyamide blocks and polyether blocks comprises only one type of polyamide block and only one type of polyether block. Polymers containing PA-12 blocks and PEG blocks and polymers containing PA-6 blocks and PEG blocks are advantageously used.

Advantageously, the polymer containing polyamide blocks and polyether blocks is such that the polyamide is the major constituent by weight, i.e. the amount of polyamide which is in the form of blocks and that which is possibly randomly distributed in the chain represents 50% by weight or more of the polymer containing polyamide blocks and polyether blocks. Advantageously, the amount of polyamide and the amount of polyether are in the ratio (polyamide/polyether) 1/1 to 3/1 and preferably: 1/1.

The advantage of copolymers containing a polyetherdiol (meth)acrylate and polymers containing polyamide blocks and polyether blocks is that they do not migrate. The film of the invention thus has permanent antistatic properties. The proportions of these polymers and of the polyamide or of the alloy of polyamide and of polyolefin depends on the amount of polyethylene glycol blocks contained in these polymers; the more there is, the more antistatic the film.

Advantageously, the amount of these polymers is from 10 to 40 parts per 90 to 60 parts respectively of polyamide or of alloy of polyamide and of polyolefin. The invention also relates, in this first form, to films of a mixture:

a of polyamide b of copolymer containing polyamide blocks and polyether blocks c optionally of a non-functionalized polyolefin d of a functionalized polyolefin (a) and (b) have been defined above, (d) is chosen from the polyolefins mentioned above for the alloys of polyamide and of polyolefin and which contain carboxylic acid, carboxylic acid anhydride or unsaturated epoxide functions, these functions being provided by grafting or by copolymerization of corresponding monomers, for example with ethylene or olefins.

The various constituents are present in weight-amounts a, b, c and d such that:

a>0; b>0; c+d>0 a+b+c+d=100 with a/b>0.2; (a+b)/(c+d)>1 and b/(a+b+c+d)<0.5 according to an advantageous mode 0.2<a/b<5

According to another advantageous mode 0.25<b/(a+b+c+d)<0.4

Advantageously, the polyamide of the blocks of b is of the same type as the polyamide a.

The thickness of these films can range from 50 to 500 μm. The leak tightness is sufficient with thicknesses of 50 to 100 μm but, depending on the dimensions of the wrapping, the mechanical constraints may lead to large thicknesses of up to 500 μm or even more. The amount of antistatic additive needed becomes excessive, and films according to the second form of the invention are then used.

According to the second form of the invention, the inner layer (A) is made of polyamide or of an alloy of polyamide and of polyolefin. The same polyamides or the same alloys mentioned for the first form of the invention can be used, but this layer (A) contains no antistatic additives. As regards the antistatic layer (B), it can be based on polyolefin (variant 1), on polyamide (variant 2) or on an alloy of polyamide and of polyolefin (variant 3). These products can be chosen from those described in the components of the layer (A).

In these three variants, the layer (B) contains the additives described for the first form of the invention and in the same proportions. Advantageously, the antistatic additive is a polymer containing polyamide blocks and polyether blocks.

Advantageously, the film of variant 1 comprises:

10 to 40 parts of polymers containing polyamide blocks and polyether blocks;

5 to 20 parts of a compatibilizing agent;

the remainder to 100 being at least one polyolefin.

The polyolefin is advantageously polyethylene, polypropylene or a copolymer of ethylene and of an α-olefin. If the layer (A) is an alloy of polyamide and of polyolefin, then it is preferred for the polyolefin of the layer (B) to be the same as that in the layer (A).

Advantageously, the film of variant 2 comprises:

10 to 40 parts of polymer containing polyamide blocks and polyether blocks, the polyamide blocks preferably being PA-6 or PA-6,6;

the remainder being polyamide, preferably PA-6 or PA-6, 6.

Preferably, the polyamide and the polyamide of the blocks of the additive are of the same type, i.e. PA-6 or PA-6,6 for both.

If the layer (A) is made of polyamide or of an alloy of polyamide and of polyolefin, it is preferred for the polyamide of the layer (B) to be of the same type.

Advantageously, the film of the third variant comprised:

10 to 40 parts of polymers containing polyamide blocks and polyether blocks;

the remainder to 100 parts being an alloy of polyamide and of polyolefin;

the polyamide of the alloy being of the same type as that of the polyamide blocks of the polymer containing polyamide blocks and polyether blocks.

If the layer (A) is made of polyamide or of an alloy of polyamide and of polyolefin, it is preferred for the polyamide of the alloy of the layer (B) to be of the same type as the polyamide of the layer (A) or of the same type as the polyamide of the alloy of polyamide and of polyolefin of the layer (A).

According to another advantageous form, the film of the 3rd variant is a mixture of the products a, b, c and d as described in the lot form of the invention.

The thickness of the layer (A) can be between 50 and 500 $\mu$m and the thickness of each layer (B) can be between 10 and 50 $\mu$m. A coextrusion binder can be placed between the layers (A) and (B) or alternatively the layer (A) or the layers (B) can contain products for improving the adhesion of the layers (A) and (B).

Advantageously, the adhesion improver is added to the layer (B) since it is thinner than the layer (A), which makes it possible to add less. This product which is added to the layer (A) or the layer (B) is the above mentioned coextrusion binder.

By way of example of binder, mention may be made of:

polyethylene, polypropylene, copolymers of ethylene and of at least one $\alpha$-olefin, mixtures of these polymers, all of these polymers being grafted with unsaturated carboxylic acid anhydrides such as, for example, maleic anhydride. Mixtures of these grafted polymers and of these non-grafted polymers can also be used.

copolymers of ethylene with at least one product chosen from (i) unsaturated carboxylic acids, their salts and their esters, (ii) vinyl esters of saturated carboxylic acids, (iii) unsaturated dicarboxylic acids, their salts, their esters, their hemiesters and their anhydrides, (iv) unsaturated epoxides; these copolymers can be grafted with unsaturated dicarboxylic acid anhydrides such as maleic anhydride or unsaturated epoxides such as glycidyl methacrylate.

If the layers (A) and (B) are of the same type, then it is not necessary to use a coextrusion binder or even to add it to the layers (A) or (B). Such is the case, for example, when (A) and (B) are made of an alloy of polyamide and of polyolefin, (B) is made of the same alloy as (A) but in which there is an antistatic additive.

The advantage of polymers containing polyamide blocks and polyether blocks as antistatic additives is not only that they do not migrate over time, thus conserving the antistatic effect, but also that there is no delamination between (A) and (B). This is because additives which migrate generally cause an adhesion defect between (A) and (B).

A particularly advantageous embodiment of the second form of the invention is such that:

(A) is an alloy of polyamide and of polyolefin;

(B) is a mixture of 10 to 40 parts of a polymer containing polyamide blocks and polyether blocks and the remainder to 100 parts being the same alloy as (A).

The polyamide of the alloy is preferably the same as that of the polyamide blocks of the polymer containing polyamide blocks and polyether blocks.

Preferably, (B) comprises:

a polyamide b a polymer containing polyamide blocks and polyether blocks c optionally a non-functionalized polyolefin d a functionalized polyolefin and (A) comprises the same products as (B) except for (b).

The proportions by weight of a, b, c and d in (B) are those already mentioned for the 1st form of the invention.

For example, a is PA-6, b is a polymer containing PA-6 blocks and PEG blocks, c is a copolymer of ethylene and of an $\alpha$-olefin and d is an ethylene/alkyl (meth)acrylate/maleic anhydride copolymer.

Another particularly advantageous embodiment of the second form of the invention is such that:

(A) is an alloy of polyamide and of polyolefin;

(B) is a mixture of:

10 to 40 parts of a polymer containing polyamide blocks and polyether blocks;

5 to 20 parts of a compatibilizing agent;

the remainder to 100 being at least one polyolefin.

Preferably (A) comprises:

55 to 70 parts of PA-6;

5 to 15 parts of an ethylene/alkyl (meth)acrylate/maleic anhydride copolymer;

the remainder to 100 parts being the same polyethylene used in (A).

According to a third form, the film of the invention comprises at least one inner layer made of polyolefin, and on each side an antistatic outer layer (B1) made of polyamide or of an alloy of polyamide and of polyolefin, in which is dispersed an agent in order to make it antistatic.

The polyolefin of the inner layer can be chosen from the polyolefins already mentioned above. Advantageously, polyethylene, polypropylene or ethylene/$\alpha$-olefin copolymers are used. The outer layers (B1) can be chosen from variant 2 and variant 3 of the film (B) of the second form of the invention.

Preferably, (B1) is variant 3. The thickness of the inner layer can be between 50 and 500 $\mu$m and the thickness of each layer (B1) can be between 10 and 50 $\mu$m. As for the second form of the invention, a coextrusion binder can be placed between the inner layer and the layers (B1) or alternatively the inner layer or the layers (B1) can contain products for improving the adhesion of the layers. These products are the same as those described in the second form of the invention.

The various layers in the films of the invention can contain the usual additives, such as anti-UV agents, antioxidants and slip agents.

The films of the invention are manufactured by the usual thermoplastic techniques. The constituents of the various layers are mixed together in blenders or extruders and the resulting mixtures, i.e. the mixtures having, respectively, the composition of the layers A, B, B1 and the binder, are introduced into a device for producing a mono- or multilayer film such as [lacuna]

EXAMPLES

A film (F1) consisting of the following was manufactured:
100 parts of an alloy of PA-6 and of polyolefin comprising:
  65 parts of PA-6
  27 parts of PEED of melt index 1 (190° C.)
  8 parts of an ethylene/butyl acrylate/maleic anhydride copolymer containing 5.5% acrylate and 3.6% anhydride.

A film F2 consisting of the following was manufactured:
  94 parts of the alloy used to make F1
  6 parts of a polymer containing PA-6 blocks of mass $\overline{Mn}$ 1500 and PEG blocks of mass $\overline{Mn}$ 1500
  and having a Shore D hardness of 40.

A film F3 consisting of the following was manufactured:
  88 parts of the alloy of F1
  12 parts of the polymer containing polyamide 6 blocks and PEG blocks used for F2.

These films have a thickness of 50 µm. They illustrate various layers A, B or B1 of the invention.

The surface resistivity according to Standard UTE 26215/ASTM D 257, the ½ discharge time and the 90% discharge time were measured on these films.

The films of the invention are considered to be antistatic when the ½ discharge time is less than 3 seconds.

The ½ discharge time is measured as follows:

A sample is placed on an earthed rotating platter. An electrode is placed, out of contact, above the sample and is brought to 10 Kvolts. This results in ionization of the air and a deposition of charge on the sample to the saturation point.

Another diametrically opposite electrode measures the surface potential. When the surface potential reaches a steady level, this means that as much charge is flowing off as is deposited. The charging is stopped and the time after which the surface potential has fallen to half of the steady level is then measured. This time is referred to as the half-discharge time.

By analogy, the 90% discharge time is measured.

The results are given in Table 1 below.

| Film | Surface resistivity in Ω | ½ discharge time | 90% discharge time |
|---|---|---|---|
| F1 | >$10^{16}$ | 35 to 60 s | >60 s |
| F2 | $9.8 \times 10^{11}$ | 1.8 to 2 s | 15 to 17 s |
| F3 | $3.2 \times 10^{11}$ | 0.8 to 1 s | 5 to 7 s |

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above references are hereby incorporated by reference.

We claim:

1. Antistatic wrapping film comprising at least one layer made of polyamide or an alloy of polyamide and polyolefin, wherein antistatic properties of said film are permanent.

2. Film according to claim 1, comprising a layer made of polyamide or an alloy of polyamide and polyolefin, in which is dispersed an additive to make it antistatic.

3. Film according to claim 1, comprising:

a) at least one inner layer (A) made of
  i) polyamide or
  ii) an alloy of polyamide and polyolefin, and
b) on each side an antistatic outer layer (B) made of
  i) polyolefin, polyamide or
  ii) an alloy of polyamide and polyolefin,
  iii) in which is dispersed an additive to make it antistatic.

4. Film according to claim 1, comprising at least one inner layer made of polyolefin, and on each side an antistatic outer layer (B1) made of polyamide or an alloy of polyamide and polyolefin, in which is dispersed an additive to make it antistatic.

5. Film according to claim 2, wherein the antistatic additive is a polymer containing polyamide blocks and polyether blocks.

6. Film according to claim 5, wherein the amount of polymer containing polyamide blocks and polyether blocks is from 10 to 40 parts by weight per 90 to 60 parts respectively of the polymer of the antistatic layer.

7. Film according to claim 3, wherein (B) comprises:
  10 to 40 parts by weight of polymer containing polyamide blocks and polyether blocks;
  5 to 20 parts of a compatibilizing agent;
  the remainder to 100 parts of at least one polyolefin.

8. Film according to claim 3, wherein (B) comprises:
  10 to 40 parts by weight of polymer containing polyamide blocks and polyether blocks;
  the remainder to 100 parts of an alloy of polyamide and of polyolefin, the polyamide of the alloy being of the same type as that of the polyamide blocks of the polymer containing polyamide blocks and polyether blocks.

9. Film according to claim 7, wherein:
  (A) is an alloy of polyamide and polyolefin and
  (B) is a mixture of:
    10 to 40 parts by weight of polymer containing polyamide blocks and polyether blocks;
    5 to 20 parts of a compatibilizing agent; and
    the remainder to 100 parts of at least one polyolefin.

10. Film according to claim 4, wherein (A) is made of polyethylene, of polypropylene or ethylene/α-olefin copolymer and (B1) comprises:
  10 to 40 parts by weight of polymer containing polyamide blocks and polyether blocks; and
  the remainder to 100 parts of an alloy of polyamide and polyolefin, the polyamide of the alloy being of the same type as that of the polyamide blocks of the polymer containing polyamide blocks and polyether blocks.

11. Wrapping comprising the films of claim 1.

12. Film according to claim 8, wherein (B) comprises:
  a) a polyamide,
  b) a polymer containing polyamide blocks and polyether blocks,
  c) optionally a non-functionalized polyolefin, and
  d) a functionalized polyolefin, and
wherein (A) comprises the same products as (B) except for b).

* * * * *